United States Patent [19]

Bangerger

[11] Patent Number: 4,928,794
[45] Date of Patent: May 29, 1990

[54] SEALED BEARING LUBRICATOR

[76] Inventor: Timothy W. Bangerger, P.O. Box 119, Leoti, Kans. 67861

[21] Appl. No.: 347,019

[22] Filed: May 4, 1989

[51] Int. Cl.$^5$ .............................................. F16C 1/24
[52] U.S. Cl. ...................................................... 184/5.1
[58] Field of Search ........................................ 184/5.1

[56] References Cited

U.S. PATENT DOCUMENTS

| | | | |
|---|---|---|---|
| 2,160,214 | 5/1939 | Jackson | 184/5.1 |
| 2,369,178 | 2/1945 | Richmond | |
| 2,396,124 | 3/1946 | Pitisci | |
| 2,515,208 | 7/1950 | Fox | 184/5.1 |
| 2,656,012 | 10/1953 | Thorpe | |
| 2,873,817 | 2/1959 | Gerber | 184/5.1 |
| 2,911,068 | 11/1959 | Wright | |
| 4,304,446 | 12/1981 | Goodine | |
| 4,355,702 | 10/1982 | Schulz | 184/5.1 |

FOREIGN PATENT DOCUMENTS 597766 2/1948 United Kingdom ................. 184/5.1

Primary Examiner—Douglas Hart
Attorney, Agent, or Firm—Fleit, Jacobson, Cohn, Price, Holman & Stern

[57] ABSTRACT

A sealed bearing lubricator which is self-contained and capable of lubricating more than one size of sealed bearing without the sealed bearing being removed from a pulley or other rotatable component which it normally supports. The lubricator includes an externally threaded bolt that extends through the inner race of the sealed bearing with two conical nuts threaded thereon to rigidly secure the bolt in position and centralize it in relation to the inner race of the sealed bearing. A larger retaining nut is mounted on either outer end of the bolt to retain a reversible cylindrical member in sealed engagement with the outer race of the bearing or a portion of the pulley or other rotatable component with which the sealed bearing is associated. The cylindrical member includes a hollow pressure chamber for receiving lubricant through a fitting extending externally of the cylindrical member to enable lubricant to be pumped into the chamber and pressurized to force it past the external seal on one end of the sealed bearing thereby lubricating the sealed bearing to prolong its useful life.

11 Claims, 1 Drawing Sheet

SEALED BEARING LUBRICATOR

BACKGROUND OF THE INVENTION

FIELD OF THE INVENTION

The present invention generally relates to a lubricator and more specifically a sealed bearing lubricator which is self-contained and capable of lubricating more than one size of sealed bearing without the sealed bearing being removed from a pulley or other rotatable component which it normally supports. The lubricator includes an externally threaded bolt that extends through the inner race of the sealed bearing with two conical nuts threaded thereon to rigidly secure the bolt in position and centralize it in relation to the inner race of the sealed bearing. A larger retaining nut is mounted on either outer end of the bolt to retain a reversible cylindrical member in sealed engagement with the outer race of the bearing or a portion of the pulley or other rotatable component with which the sealed bearing is associated. The cylindrical member includes a hollow pressure chamber for receiving lubricant through a fitting extending externally of the cylindrical member to enable lubricant to be pumped into the chamber and pressurized to force it past the external seal on one end of the sealed bearing thereby lubricating the sealed bearing to prolong its useful life.

INFORMATION DISCLOSURE STATEMENT

Sealed bearings have been incorporated into various rotatable components such as idler pulleys and the like with the intent being to eliminate the necessity of periodically lubricating the support bearings by a person engaging a grease gun with a fitting and pumping lubricant into the bearing. Idler pulleys are constructed with the intent that when the sealed bearing becomes dry and worn, the idler pulley is removed and disposed of and a new idler pulley with new sealed bearing replaces the throw away unit. However, the sealed bearing can be lubricated and efforts have been made to provide structures for this purpose including the following U.S. Pat. Nos.:

2,369,178
2,396,124
2,656,012
2,911,068
4,304,446

None of the above-mentioned patents discloses a structure that is self-contained and capable of lubricating different sizes of sealed bearings which is a capability of this invention.

SUMMARY OF THE INVENTION

An object of the present invention is to provide a sealed bearing lubricator which includes a through bolt that is externally threaded and receives a pair of conical nuts thereon with the bolt extending through the inner race of the sealed bearing and the nuts securely mounting the bolt in position and centrallizing it in relation to the the inner race of the sealed bearing with the bolt securing a cylinder and retaining nut on either end thereof with the cylinder providing a pressure chamber to enable pressurized lubricant to be forced past the external seal on the sealed bearing.

Another object of the invention is to provide a sealed bearing lubricator in accordance with the preceding object in which the cylinder is provided with diameters that are different on each end thereof with each end of the cylinder having an O-ring seal thereon engageable with the sealed bearing or a portion of the pulley or other rotatable component with which the sealed bearing is associated to seal the cylinder in relation to the sealed bearing thereby enabling pressurized lubricant within the cylinder to be forced into the sealed bearing.

A further object of the invention is to provide a sealed bearing lubricator in accordance with the preceding objects in which the retaining nut is conical in shape and larger than the mounting nuts for the externally threaded bolt with the cylinder including a Zerk fitting to enable lubricant to be pumped into the interior chamber defined by the cylinder and pressurized so that the lubricant will be forced into the sealed bearing.

Still another object of the invention is to provide a sealed bearing lubricator in which all of the nuts are provided with knurled external surfaces to facilitate gripping and rotation thereof with the bolt forming a self-contained unit when associated with the nuts and cylinder with the entire structure being relatively simple to use, effective in operation, long-lasting and dependable as well as being expressly constructed to effectively perform its intended functions.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
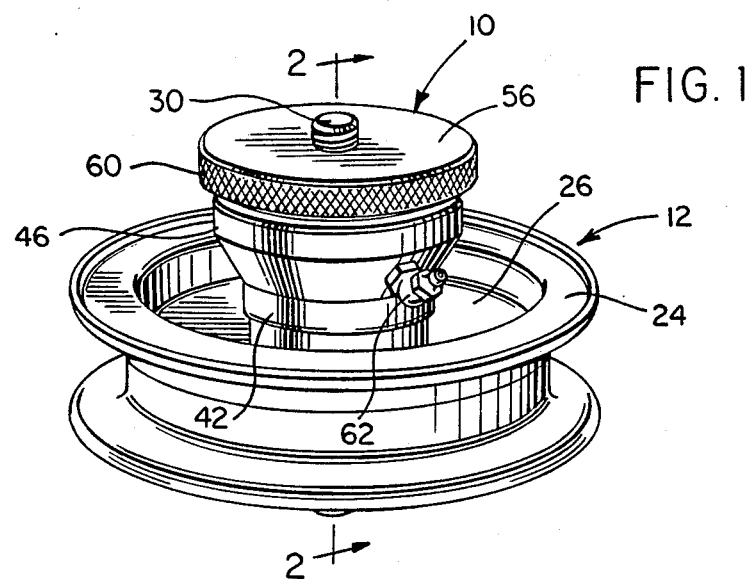
FIG. 1 is a perspective view of the sealed bearing lubricator of the present invention associated with a sealed bearing mounted permanently in a pulley.

Referring now specifically to the drawings, the sealed bearing lubricator of the present invention is designated by the numeral 10 and is illustrated in association with a pulley 12 and a sealed bearing 14 installed permanently in the pulley. It is pointed out that the lubricator 10 will be used with various types of sealed bearings associated with various rotatable components which may be supported by the bearing. The sealed bearing 14 is of conventional construction and includes an outer race 16, an inner race 18, ball bearing elements 20 and seals 22 interconnecting and sealing the inner and outer races in a well-known manner thereby retaining a supply of lubricant within the space between the races and in lubricating association with the ball bearings 20 in a conventional and well-known manner. The pulley 12 includes the usual external flange 24, a web 26 and a hub portion 28 with the hub portion 28 being permanently mounted in partially enclosing relation to the outer race 16 of the sealed bearing 14 in a conventional and well-known manner. The pulley illustrated is an idler pulley and the idler pulley and sealed bearing are mounted in such a manner that when the sealed bearing commences wear, the idler pulley is removed and replaced along with the sealed bearing as an assembly in a well-known procedure.

Figure 2:
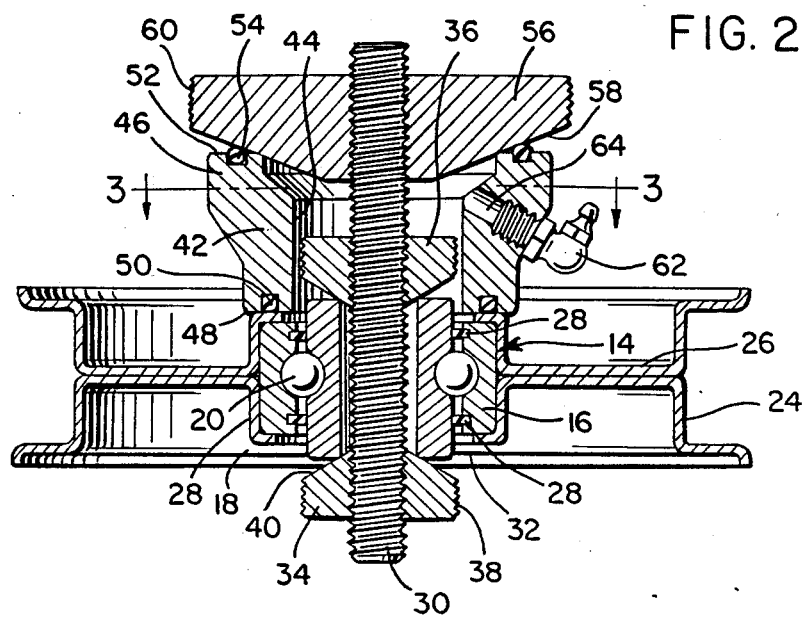
FIG. 2 is a vertical, sectional view on an enlarged scale, taken substantially upon a plane passing along section line 2—2 on FIG. 1 illustrating specific structural details of the invention.
Figure 3:
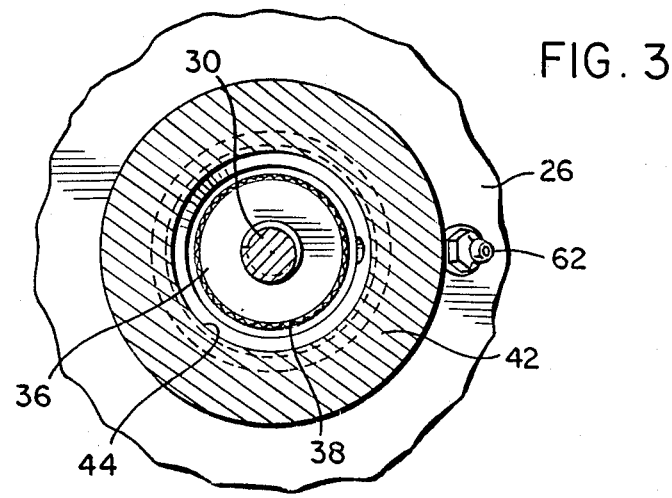
FIG. 3 is a transverse, sectional view taken substantially upon a plane passing along section line 3-3 on FIG. 2 illustrating further structural details of the invention.

The lubricator 10 includes an elongated externally threaded mounting bolt 30 which has a length substantially greater than the length of the sealed bearing with the bolt 3 extending through the inner race 18 and slightly spaced from the interior surface 32 thereof as illustrated in FIG. 2. A pair of nuts 34 and 36 are threadedly mounted on the bolt 30 with each of the nuts including a knurled outer surface 38 and a tapered or conical inner end 40. The conical inner ends 40 are opposed in relation to each other and engage the end of the inner race 18 of the sealed bearing 14 thus rigidly securing the bolt 30 to the inner race and centralizing the bolt 30 in relation to the inner race 18 of the sealed bearing 14.

Positioned in concentric enclosing relation to one of the nuts 36 and a portion of the bolt 30 is a cylinder 42 which has an interior diameter 44 substantially greater than the bolt 30 and greater than the nut 36 thus enclosing the nut 36. One end of the cylinder 42 includes an outwardly offset portion 46 as illustrated in FIG. 2 thus providing two different diameter end faces to the cylinder 42. The smaller end face 48 includes an O-ring groove and O-ring 50 formed therein for sealing engagement with the hub portion of the pulley or the outer race 16 of the sealed bearing. The larger end face 52 of the cylinder 42 is also provided with an O-ring groove and O-ring 54 therein to engage the hub portion or outer race of a sealed bearing of a larger diameter than the smaller end face 48 so that by inverting the cylinder 42, either the smaller face end or the larger face end of the cylinder can be associated with the sealed bearing and pulley or other rotatable component thereby enabling the lubricator to be used with different sizes of sealed bearing assemblies.

A retaining nut 56 that is larger than the nuts 34 and 36 is mounted on the end of the bolt 30 for threading inwardly and outwardly during rotation with the retaining nut including an inclined or conical inner surface 58 which engages the inner edge of the end face 52 as illustrated in FIG. 2 or 48 if the cylinder is inverted thereby forming a seal for the exterior of the inner cavity 44. The external surface of the nut 56 is knurled as at 60 to facilitate rotational movement thereof. Thus with the cylinder assembled onto the bolt and the retaining nut 56 tightened, the cylinder will be centralized due to the conical surface 58 thus registering the O-ring seal 50 with the hub portion or outer race of the sealed bearing thereby sealing the cylinder with respect to the sealed bearing. The nut 36 engaging the inner edge of the inner race 18 of the sealed bearing also forms a seal for the inner portion of the chamber 44 along with the O-ring seal 50 as illustrated in FIG. 2. With the assembly positioned in the manner illustrated in FIG. 2, a source of pressurized lubricant such as a grease gun or the like may be engaged with a Zerk fitting or other lubrication fitting 62 that is screw threaded into a bore or passageway 64 through the cylinder 42 thus introducing lubricant under pressure into the chamber 44 with the pressurized lubricant being forced past the sealed bearing seal 22 thus lubricating the bearing elements 20 with the used lubricant or grease being discharged from the opposite end of the sealed bearing.

While dimensional characteristics may vary, one successful unit has included an external diameter of the smaller end face 48 being 1¾" and the external diameter of the larger end face 52 being 2¼". The grease fitting may be a 90° grease fitting or a straight grease fitting and screw threaded into the bore or passageway 64. The nuts 34 and 36 may have a diameter of 1" and the conical surfaces may be at an angle of 30° with the retaining nut 56 having a 2½" diameter and an angle of 20° on the inclined surface 58. The structure of the bolt may be a standard bolt usually provided without a head to enable the nuts to be assembled from either end and to enable the lubricator to be assembled in either position in relation to the sealed bearing. The bolt 30 holds the unit together during the process of lubricating the bearing and provides a self-contained unit with all of the components being attached directly to the bolt with the cylinder being capable of inversion in the position illustrated in FIG. 2 or inverted in relation thereto thereby enabling the lubricator to be used with different sizes of sealed bearings.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

WHAT IS CLAIMED AS NEW IS AS FOLLOWS:

1. A sealed bearing lubricator comprising an externally threaded bolt adapted to extend through an inner race of a sealed bearing, spaced nuts threadedly engaged with the bolt and engaging the ends of the inner race of the sealed bearing to mount the bolt rigidly with respect to the sealed bearing, a cylindrical member mounted on the bolt in enclosing relation to one of the nuts and in sealed relation to the sealed bearing, a retaining nut on the bolt threadedly engaged therewith and engaged with the outer end of the cylindrical member to retain the cylindrical member against the sealed bearing, and pressurized lubricant introduction means in the cylinder to pressurize the interior of the cylinder with lubricant to force lubricant past an external seal on the sealed bearing.

2. The structure as defined in claim 1 wherein said cylinder includes an offset portion forming an end having a smaller diameter and an end having a larger diameter thereby enabling the cylinder to be inverted to engage sealed bearings of different diameters.

3. The structure as defined in claim 2 wherein said nuts on the bolt engaged with the inner race of the sealed bearing include inwardly facing conical surfaces to centralize the bolt in relation to the inner race of the sealed bearing.

4. The structure as defined in claim 3 wherein said retaining nut includes an inclined conical inner surface engaged with the end of the cylinder to centralize the cylinder in relation to the bolt and sealed bearing.

5. The structure as defined in claim 4 wherein each of the nuts engaged with the inner race of the sealed bearing has an external knurled surface and the retaining nut has an external knurled surface to facilitate rotational movement of the nuts.

6. The structure as defined in claim 4 wherein said cylindrical member includes an O-ring seal incorporated into each end thereof for sealing engagement with the sealed bearing externally of the seal on the sealed bearing to retain pressurized lubricant within the cylinder when lubricating the bearing.

7. The structure as defined in claim 4 wherein said lubricant introduction means includes a lubrication fitting communicating with a passage through the cylinder, the interior of the cylinder being spaced from the nut engaging the end of the inner race and the bolt to provide a pressurized chamber for lubricant.

8. A bearing lubricator comprising a support member adapted to extend through an inner race of a bearing, means adjustably mounted on the support member and engaging the ends of the inner race of the bearing to mount the support member rigidly with respect to the bearing, a hollow member mounted on the support member in relation to the bearing, retaining means on the support member engaged with the outer end of the hollow member to retain the hollow member against the bearing, and means introducing pressurized lubricant into the hollow member to pressurize the interior thereof with lubricant to force lubricant into the interior of the sealed bearing.

9. The structure as defined in claim 8 wherein said hollow member includes an offset portion forming an end having a smaller diameter and an end having a larger diameter thereby enabling the hollow member to be inverted to engage bearings of different diameters.

10. The structure as defined in claim 8 wherein said means on the support member engaged with the inner race of the bearing includes inwardly facing conical surfaces to centralize the support member in relation to the inner race of the bearing.

11. The structure as defined in claim 8 wherein said retaining means includes an inclined conical inner surface engaged with the outer end of the hollow member to centralize it in relation to the bearing.

* * * * *